United States Patent
Keogh

[19]

[11] Patent Number: 5,908,574
[45] Date of Patent: Jun. 1, 1999

[54] INDUCTION RADIANT BROILER

[75] Inventor: Alan C. Keogh, Oakville, Canada

[73] Assignee: Garland Commercial Industries, Inc., Freeland, Pa.

[21] Appl. No.: 09/062,498

[22] Filed: Apr. 17, 1998

[51] Int. Cl.⁶ ........................................ H05B 6/12
[52] U.S. Cl. .................. 219/622; 219/620; 99/392
[58] Field of Search ........................... 219/618, 620, 219/621, 622, 623, 625, 497, 492, 506, 719, 408, 399; 99/327, 389, 392, 402, 422, 446, 467; 426/523

[56] References Cited

U.S. PATENT DOCUMENTS

| | | |
|---|---|---|
| 3,530,310 | 9/1970 | Adelson et al. . |
| 3,530,499 | 9/1970 | Schroeder ............................. 219/621 |
| 3,637,970 | 1/1972 | Cunningham . |
| 3,697,716 | 10/1972 | Kornrumf . |
| 3,710,062 | 1/1973 | Peters, Jr. . |
| 3,742,337 | 6/1973 | Digneffe . |
| 3,770,928 | 11/1973 | Kornrumpf et al. . |
| 3,775,577 | 11/1973 | Peters, Jr. . |
| 3,781,503 | 12/1973 | Harnden, Jr. et al. . |
| 3,781,505 | 12/1973 | Steigerwald . |
| 3,786,219 | 1/1974 | Kornrumpf et al. . |
| 3,786,222 | 1/1974 | Harnden, Jr. et al. . |
| 3,806,688 | 4/1974 | MacKenzie et al. . |
| 3,932,801 | 1/1976 | Peters, Jr. . |
| 3,953,783 | 4/1976 | Peters, Jr. . |
| 3,974,472 | 8/1976 | Gould, Jr. . |
| 4,001,699 | 1/1977 | Denny et al. . |
| 4,010,342 | 3/1977 | Austin . |
| 4,011,428 | 3/1977 | Fosnough et al. . |
| 4,046,991 | 9/1977 | Sefton et al. . |
| 4,114,009 | 9/1978 | Kiuchi et al. . |
| 4,149,217 | 4/1979 | Tucker . |
| 4,169,222 | 9/1979 | Tucker . |
| 5,227,597 | 7/1993 | Dickens et al. ..................... 219/622 |
| 5,665,263 | 9/1997 | Gaspard .............................. 219/625 |

*Primary Examiner*—Tu Ba Hoang
*Attorney, Agent, or Firm*—Ohlandt, Greeley, Ruggiero & Perle

[57] ABSTRACT

An induction broiler which includes a non-metallic support plate and a hot grate for broiling food thereon. The grate includes a plurality of spaced apart elongated metallic bars. Each elongated metallic bar has a base portion disposed above and adjacent to the non-metallic support plate and a food heating surface opposite the base surface. The induction broiler further includes at least one induction heating coil connected to a power supply and mounted below and adjacent to the non-metallic support plate. During operation, the induction heating coils generate an alternating magnetic field which is coupled into the grate across the support plate. As a result, current flow is induced through the elongated bars which, in turn, results in the heating of the food heating surface of each elongated bar.

23 Claims, 4 Drawing Sheets

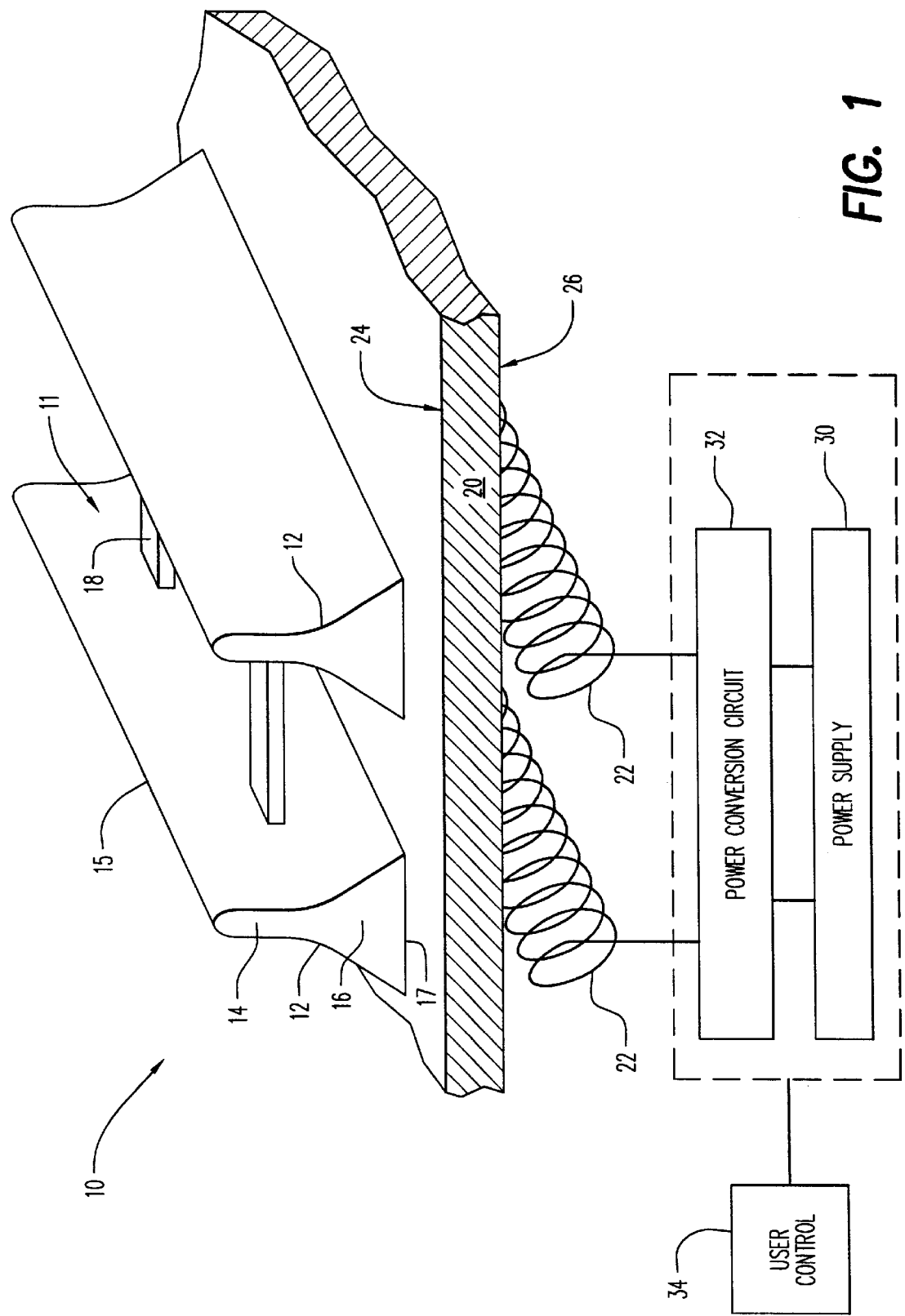

INDUCTION RADIANT BROILER

FIELD OF THE INVENTION

The present invention relates to induction cooking and, more particularly, to an induction cooking appliance for broiling food products.

BACKGROUND OF THE INVENTION

Broilers or grills for cooking food items have been known to be used in combination with a gas burner or electrical heating plate, examples of which can be found in U.S. Pat. Nos. 389,602 (Sankley), 2,117,749 (Studer) and 5,467,691 (Koziol), to impress stripped patterns on the cooked food. Such appliances employ high temperatures to heat the grill and the food thereon. As a result, the cooktop becomes hot and food which spills between the respective grates burns and chars, making it more difficult to clean.

In addition thereto, conventional methods employing gas and electrical burners provide an inefficient means for heating the grill or broiler. During operation, an amount of heat transferred from the burner to the grill is lost to the surrounding environment, resulting in an inefficient cooking system. Accordingly, there is a desire to provide a more efficient broiler that is easy to clean and safer to use.

The present invention has developed one approach to remedy the above problem, i.e., induction heating. The concept of employing induction heating to cook food on a flat surface is generally known in the art. However, conventional cool-top induction surface cooking units used in practice are directed to heating conventional pots and pans, both magnetic and non-magnetic. Such cooking units are disclosed in U.S. Pat. Nos. 3,761,667 (Walden), 3,775,577 (Peter, Jr.), 3,781,505 (Steigerwald), 3,932,801 (Peter, Jr.), and 4,010,342 (Austin). There has yet to be provided an induction cooking unit for broiling food.

The present invention has developed a broiler wherein heatable grates are placed on top of the cool-top induction surface to provide for the broiling or grilling of food products, while avoiding burning or charring of food which falls between the grates and contacts the cool-top induction surface.

The present invention provides a cooking apparatus for broiling foods using induction heating techniques. It also provides a rapid, clean, safe and efficient broiler. Finally, the present invention provides a broiling surface configured to increase significantly the capture of induction energy.

SUMMARY OF THE INVENTION

The induction broiler according to the present invention includes a nonmetallic support plate which provides a cool-top surface, and a grate for broiling food thereon. The grate includes a plurality of spaced apart elongated metallic bars. Each elongated metallic bar has a base portion, disposed above and adjacent to the nonmetallic support plate, and a food heating surface opposite the base portion. The induction broiler further includes at least one induction heating coil connected to a power supply and mounted below and adjacent to the non-metallic support plate. An air gap is provided between the grate and the at least one induction heating coil. During operation, the induction heating coils generate an alternating magnetic field which induces eddy currents at the base regions of the elongated bar. The eddy currents heat the base region and, thus, the food heating surface of each elongated bar.

The present invention employs the principle of eddy current heating to transfer energy from the induction heating coils to the grate. More specifically, the high frequency alterations of the electromagnetic field setup by the induction heating coils induce eddy currents into the bottom portion of the grate, e.g., the base portions of the elongated bars, and thereby heats the same. The amount of heat can be controlled by varying the amplitude and frequency of the supply voltage and, thus, the alternating current driving the induction heating coils. The amount of heat can also be controlled through the use of the Curie point of the grate material, e.g., the point at which the material can no longer absorb magnetic fields. It is important to understand that the transfer of energy to the grate is relatively efficient since heat is generated only in the grate. The recovery under the load is also significantly improved. In addition, induction heating is a clean and safe heating method which does not result in the emission of odorous and combustible gases.

The elongated bar is configured to have the base portion larger than the cooking portion, such that a greater amount of heat is drawn to the base portion and dissipated therefrom to a surrounding environment. That is, the base region of each elongated bar acts as a receptor to the induction energy to provide more uniform heating of the food heating surface. This can be accomplished by configuring the food heating surfaces of the elongated bars with a smaller cross-sectional width than their respective base surfaces. For instance, the cross-sectional area of the elongated bars may taper from the base surface to the food heating surface. Accordingly, the cross-sectional area of the elongated bar may have a triangular shape, a parabolic shape or the like.

The elongated bar is preferably made of cast iron or ferrous materials, which effects only a slight change in the inductance of the induction heating coils and serve to introduce a primarily resistance in series with the induction heating coils. This results in a more efficient coupling of the alternating magnetic field from induction heating coils.

The tapered shape of the elongated bar also provides the additional benefit of directing juices or fats from a food item thereon downwardly towards the hot base portion of the elongated bar. This results in smoke (e.g., hot gases) and flashes, the smoke rising upwardly between each elongated bar to give the food item the typical barbecue flavor. Furthermore, the remaining juices flow onto the cool-top surface of the support plate and do not burn or char on the support plate, that is, since the support plate remains cool, the juices and falling parts of food items do not burn or char there upon. The broiler is thus easier to clean than broilers and grills of the prior art.

The foregoing and other objects and advantages of the present invention will be more apparent from the following detailed explanation of the preferred embodiments in connection with the accompany drawings;

BRIEF DESCRIPTION OF THE DRAWINGS

FIG. 1 illustrates an overall schematic top-side perspective view of an induction broiler in accordance with the present invention;

DETAILED DESCRIPTION OF THE INVENTION

Figure 2A:
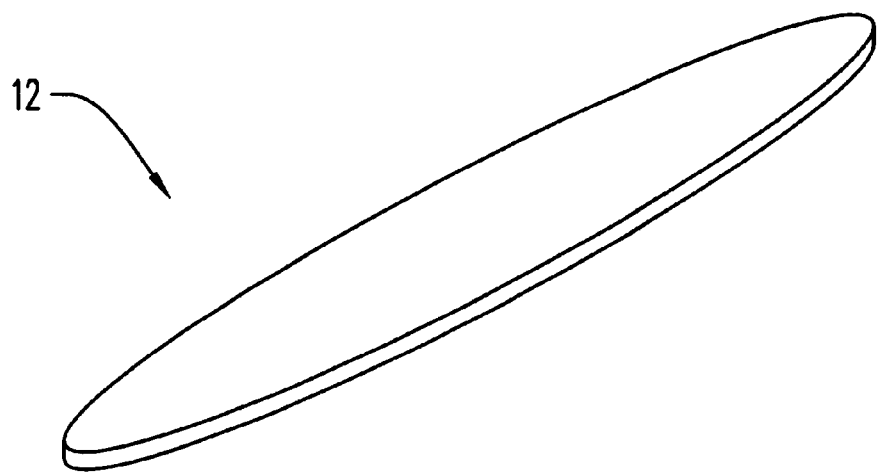
FIG. 2A illustrates an oval-shaped induction heating coil according to one embodiment of the present invention.

Referring to FIG. 1, there is provided an induction radiant broiler 10 in accordance with the present invention. Broiler 10 includes a support plate 20 having a first surface 24 (top surface) and a second surface 26 (bottom surface) positioned opposite first surface 24; a grate 11 disposed on first surface 24 for broiling food thereon; and a plurality of induction heating coils 22 positioned opposite (e.g., below) second surface 26. Induction heating coils 22 are coupled to a power supply 30 across power conversion circuit 32 for driving induction heating coils 22. A user control 34 allows an operator to adjust an amplitude and frequency of the alternating magnetic field generated by induction heating coils 22 via power supply 30 and power conversion circuit 32. Accordingly, broiler 10 can be operated to broil food at a desired cooking or grate temperature with the use of induction heating.

In operation, power conversion circuit 32 is energized by power supply 30, which can either be a source of alternating voltage or a source of direct voltage. Power conversion circuit 32 generates a frequency wave that drives induction heating coils 22. Induction heating coils 22, in turn, generate an alternating magnetic field at a desired frequency range. The alternating magnetic field induces eddy currents at a base portion of grate 11, which is seated on support plate 12 and acts as a single turn shorted secondary. As a result, the induced eddy currents heat grate 11 to a temperature for cooking food thereon, but not support plate 20 which remains cool to the touch. The transfer of energy to grate 11 is relatively efficient since heat is generated only in grate 11. Accordingly, broiler 10 requires less electrical power to operate as compared to conventional electric and gas heating devices. Induction heating of broiler 10 is also a clean and safe heating method which does not result in the emission of odorous, combustible and toxic gases (e.g., as in gas heating).

Turning to a more detailed description of the present invention as shown in FIG. 1, support plate 20 includes first surface 24 and second surface 26, positioned opposite first surface 24. Both first and second surfaces (24, 26) preferably are substantially planar and unbroken. Support plate 20 comprises a non-metallic material, such as glass, stainless steel, plastic and ceramic. It is preferred that support plate 20 is made of a ceramic material. Support plate 20 may include some metallic content for shielding and decorative purposes, but this is necessarily limited to a small amount.

Referring again to FIG. 1, grate 11 includes a plurality of spaced apart elongated bars 12 made of a conductive or metallic material. Elongated bar 12 includes a cooking portion 14 having a food heating surface 15 which extends along a length of elongated bar 12. Elongated bar 12 further includes a base portion 16 having base surface 17 which also extends along the entire length of elongated bar 12. Base surface 17 of elongated bar 12 is positioned above and adjacent to first surface 24 of support plate 20. It is preferred that base surface 17 is substantially planar (i.e., disposed parallel to plate 20). The planar base surface 17 allows elongated bar 12 to be stably seated on first surface 24 of support plate 20 such that magnetic energy is efficiently coupled thereto from induction heating coils 22. That is, the magnetic energy is transferred from induction heating coils 22 to elongated bar 12, across support plate 12, and induces eddy currents which heat base portion 16 of elongated bar 12.

It is preferred that elongated bar 12 is made of cast iron or ferrous materials, which effects only a slight change in the inductance of induction heating coils 22 and serve to introduce a primarily resistance in series with the induction heating coils. This results in a more efficient coupling of the alternating magnetic field from induction heating coils 22 to grate 11.

Induction heating coils 22 are positioned below and adjacent to second surface 26 and generate an alternating magnetic field or flux which is coupled to grate 11, across support plate 20. The present invention employs the principle of eddy current heating to transfer energy from induction heating coils 22 to grate 11. More specifically, the high frequency alterations of the electromagnetic field setup by the induction heating coils induce eddy currents into the bottom portion of the grate, e.g., the base portions of the elongated bars and thereby heats the same. The amount of heat can thus be controlled by varying the amplitude and frequency of the voltage and, thus, the current supplied to the induction heating coils. Alternatively, the amount of heat can be controlled by selecting an appropriate grate material with a suitable Curie point.

Figure 2B:
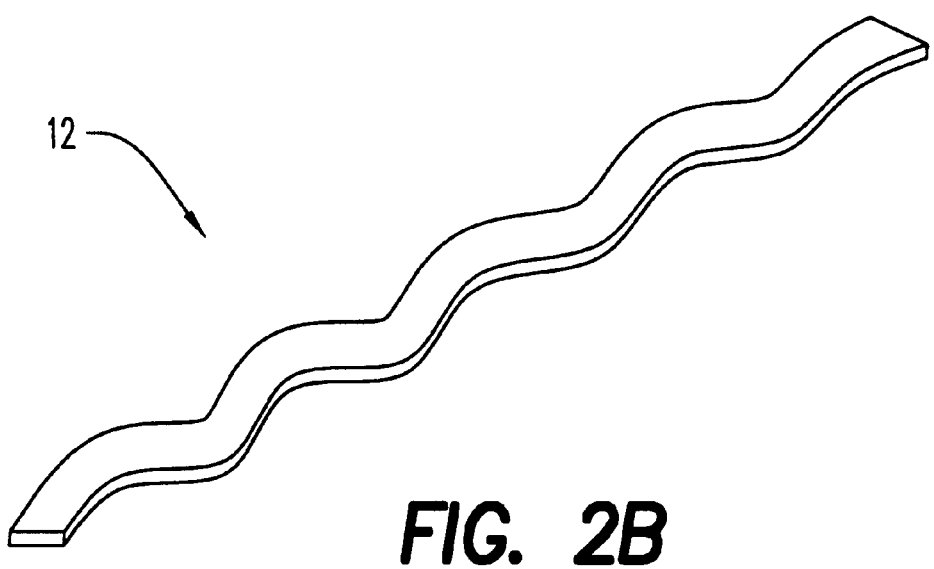
FIG. 2B illustrates a snake-shaped induction heating coil according to another embodiment of the present invention.

As shown in FIGS. 2A and 2B, induction heating coils 22 are preferably approximately snake-shaped or oval shaped, and are preferably single layer, annular, flat air-core coils or a solid flat strip conductors with a rectangular or round cross-section. It is preferred that induction heating coils 22 preferably have a length corresponding to elongated bar 12. Each induction heating coil 22 is preferably aligned respectively below a corresponding elongated bar 12 (across support plate 20) to provide a more efficient coupling of magnetic energy. In this way, each elongated bar 12 of grate 11 will have positioned thereunder a corresponding induction heating coil 22, preferably along an entire length of elongated bar 12. Although snake-shaped and oval-shaped induction heating coils 22 are shown and described above, broiler 10 may employ any number of induction heating coils having various shapes, such as a single-piece rectangular coil, a spiral coil and so forth.

Figure 3A:
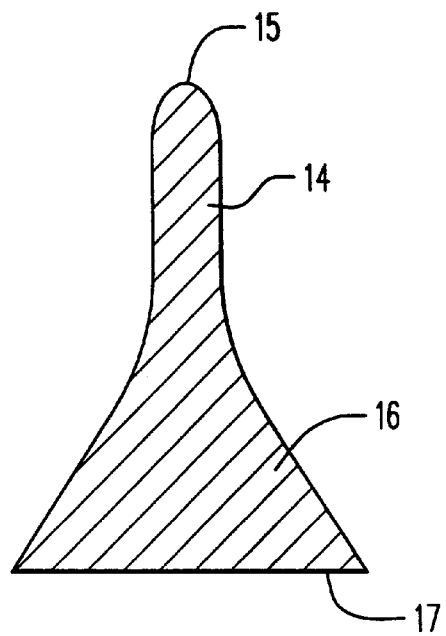
FIG. 3A illustrates a cross-sectional view of an approximate parabolic-shaped elongated bar of the present invention.
Figure 3B:
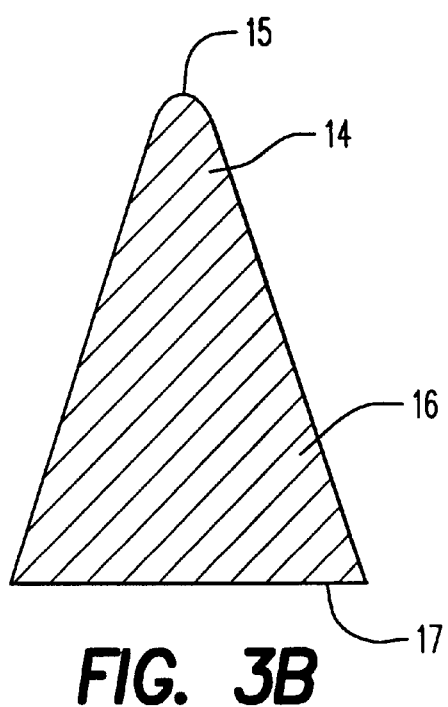
FIG. 3B illustrates a cross-sectional view of an approximate triangular-shaped elongated bar of the present invention.

Referring to FIGS. 3A and 3B, there is provided cross-sectional views of preferred elongated bar 12 in accordance with the present invention. Elongated bar 12 is configured to provide a heat sink feature to prevent the overheating of food items thereon. This is accomplished by providing elongated bar 12 with base portion 16 greater in size or area than cooking portion 14. The larger base portion 16 draws a greater amount of heat than the smaller cooking portion and dissipates heat to the surrounding environment. Base portion 16 thus acts as a heat sink to prevent food heating surface 15 from overheating and to provide more uniform heating of food heating surface 15 and food items placed thereon. It is preferred that food heating surface 15 has a smaller cross-sectional width than base surface 26. For instance, the cross-sectional area of elongated bar 12 preferably tapers off from base surface 26 to food heating surface 24 and, for example, may have an approximately parabolic shape (FIG. 3A) or triangular shape (FIG. 3B).

The tapering shape of elongated bar 12 also provides the additional benefit of directing juices or fats from the food item downwardly towards hot base portion 16 during the operation thereof. This results in smoke (e.g., hot gases) and flashes, the smoke rising upwardly between each elongated bar 12 to give the food items the typical barbecue flavor. Furthermore, the remaining juices flow onto the cool surface of support plate 20 and are not burned or charred. Broiler 10 is thus easier to clean than broilers and grills of the prior art.

Figure 4:
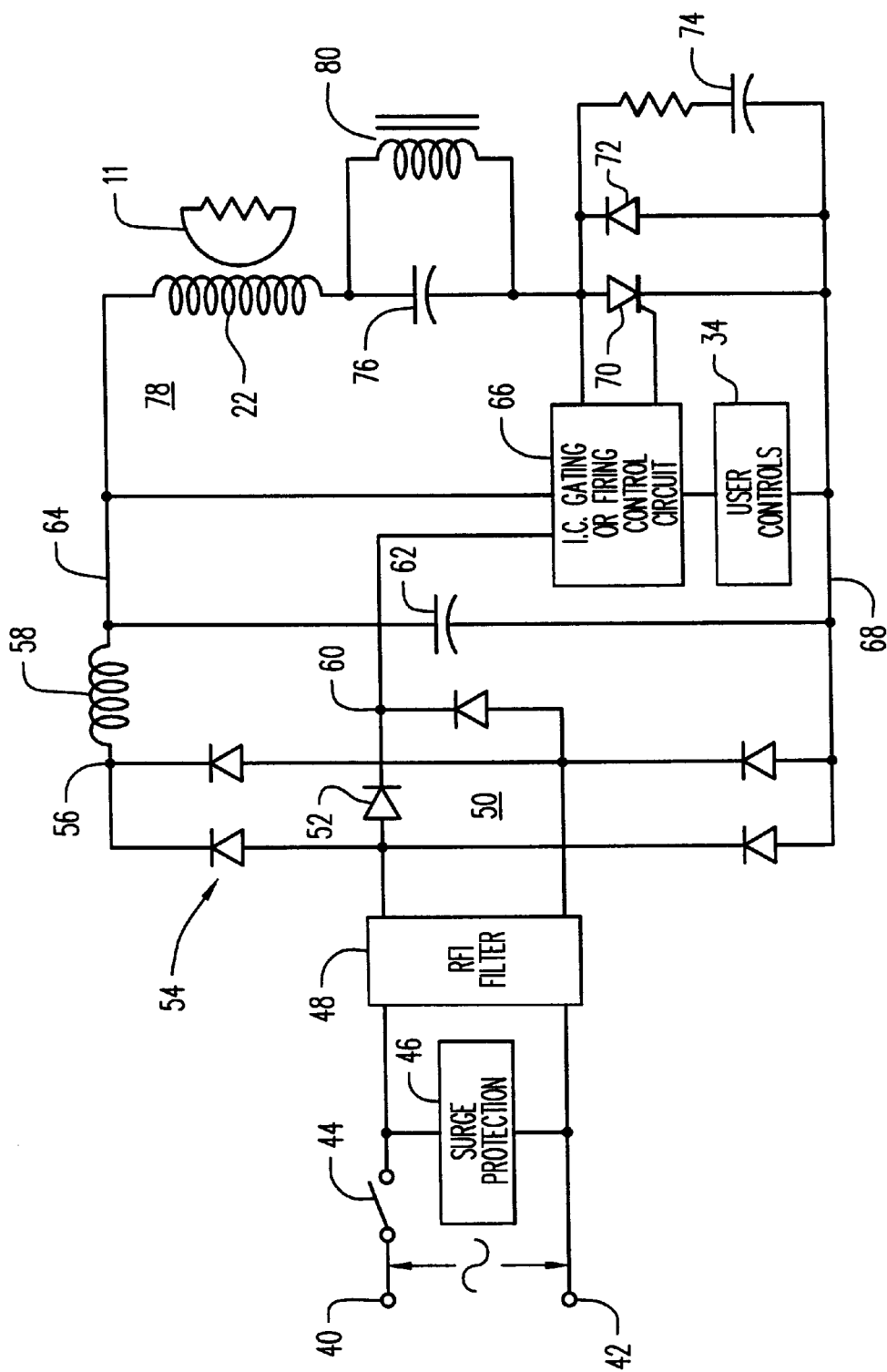
FIG. 4 illustrates a block diagram of the power conversion circuit of the present invention.

Referring to FIG. 4, there is provided a block diagram of power conversion circuit 32 which is energized by a commercially available source of alternating voltage. Power conversion circuit 32 includes a phase controlled rectifier 50 and a variable frequency one-thyristor series resonant inverter 78 in which induction heating coils 22 are used in dual function to couple power to grate 11 as well as to provide commutating inductance in the thyristor commutation circuit. Inverter 78 is therefore relatively simple and inexpensive and requires only one gating or firing circuit 66. Input terminals 40 and 42 of power converter 12 can be energized by a 120 volt, 60 Hz single phase source of power supply 20. Power conversion circuit 32 may have connected thereto a surge protection device or circuit 46 and an RFI filter 48 between input terminals 40 and 42. Surge protection circuit 46 protects broiler 10 from voltage surges in the power distribution system, while RFI filter 48 prevents ultrasonic or radio frequency generated by broiler 10 from creating a disturbance in the power system.

Power supply 30, provided by a full wave phase controlled bridge rectifier 50 and a filter network including series filter inductor 58 and a shunt filter capacitor 62, provides varying DC input voltage for inverter 78. This is one technique for controlling the power output of the inverter and, thus, the heating level or specific grate temperature, preferably in the infra-red range. Another power control mechanism is to change the inverter output frequency and therefore the rate of supplying current pulses to induction heating coils 22. Rectifier 50 can be a full wave diode rectifier when it is desired to control the power output of inverter 78 solely by varying the inverter output frequency in the manner as explained.

The heating level or specific grate temperature may also be controlled through the selection of the grate material (e.g., the material of elongated bar 12) or, more specifically, through the use of the Curie point of the grate material. The Curie point of a material is generally defined as the point at which the material can no longer absorb magnetic fields. Accordingly, broiler 10 may be configured to operate at a predetermined or fixed heating level or to prevent operation beyond a fixed heating level, by selecting an appropriate grate material or material composition with a suitable Curie point. Such an arrangement provides an efficient, cost effective approach to controlling the heating level of the grate.

Referring again to FIG. 4, the power circuit connected between DC terminals 40, 42 comprises induction heating coils 22 connected in series with a commutating capacitor 76 and the inverse parallel combination of a unidirectional conducting thyristor 70 and a power diode 72. A series RC snubber circuit 74 is also coupled across the load terminals of thyristor 70 for dv/dt protection to limit the rate of rise of reapplied forward voltage to the device. A reset inductor 31 connected directly across commutating capacitor 76 functions to recharge capacitor 76 between cycles of operation when both thyristor 70 and diode 72 are non-conducting. The load for the inverter is the electrical loss in grate 11. Accordingly, grate 11 functions as a single turn secondary winding, and induction heating coils 22 function as a single turn primary winding. The current and voltages induced in grate 11 are thus determined essentially by transformer law.

The function of gating control circuit 66 is to generate a train of variable repetition rate gating pulses for thyristor 70 and may also include control logic which ensures reliable, automatic, and satisfactory operation of broiler 10. Gating control circuit 66 can be fabricated as a monolithic or hybrid integrated circuit. To reduce the cost of broiler 10, gating control circuit 66 may includes a low voltage power supply which is energized when power is applied to inverter 78. The low voltage power supply can be connected to a power rectifier terminal 56. Alternatively, voltage can be supplied to gating control circuit 66 with continuous direct voltage independent of the power circuit by using an additional pair of half wave rectifiers 52 connected to the input terminals of main rectifier 50. The low voltage power supply is then connected to output terminal 60 of the auxiliary rectifier. It should be noted that gating control circuit 66 can be adjusted to a desired setting by appropriate user control 34, such as an adjustable resistor or potentiometer that is adjusted by turning a knob 44. Although a solid-state power conversion circuit is shown and described in FIG. 4, broiler 10 may employ other arrangements for controlling and driving induction heating coils 22.

An operational example of induction radiant broiler is provided below to explain the features of the present invention. Initially, a user selects a desired broiling temperature or, alternatively, the temperature may be fixed by the composition of the grate material. The user then activates broiler 10 via user control 34. Once activated, power supply 30 generates an output voltage corresponding to the selected broiling temperature. This causes power conversion circuit 32 to drive induction heating coils 22 with an alternating current at a selected amplitude and frequency. Induction heating coils 22 then generate a corresponding alternating magnetic field or flux which is coupled across the air gap through support plate 20 to grate 11, particularly to each base portion 16 of each elongated bar 12. The alternating magnetic field induces the flow of eddy currents at base regions 16 of elongated bars 22, thereby resulting in the heating of base portion 16. Heat is conducted from base portion 16 of each elongated bar 12 to cooking portion 14 and food heating surface 15, respectively.

As heat is generated in grate 11, base regions 16 of each elongated bar 22 acts as a heat sink, e.g., drawing and dissipating heat into the surrounding environment. As such, only a portion of the heat resulting from the eddy currents is conducted to cooking portion 14 and food heating surface 15. The remaining heat at base portion 16 is dissipated into the surrounding environment. Therefore, food heating surface 15 is prevented from overheating, and the temperature of food heating surface 15 can be controlled to reach suitable broil/char temperatures. At the same time, the tapering cross-sectional shape of elongated bars 12 directs the juices or fats from the food item downwardly along an outer surface of elongated bar 12 towards the hot base portion 16. This results in smoke (e.g., hot gases) and flashes, the smoke rising upwardly between each elongated bar to give the food items the typical barbecue or broiled flavor. The remaining juices flow (and not splatter) onto the cool surface of support plate 20 and are not burned or charred, thus making it easier to clean.

The invention having thus been described with particular reference to the preferred forms thereof, it will be obvious that various changes and modifications may be made therein without departing from the spirit and scope of the invention as defined in the appended claims.

What is claimed is:

1. An induction radiant broiler, comprising:

a non-metallic support plate providing a cool surface;

a grate for broiling food products thereon, said grate comprising a plurality of spaced apart elongated metallic bars, wherein said elongated metallic bars each have a base portion, disposed above and adjacent to said non-metallic support plate, and a food heating surface disposed opposite said base portion; and an induction heating means which is capable of coupling a magnetic field to said grate across said support plate in order to heat said elongated metallic bars to a temperature sufficient for cooking said food products disposed thereon.

2. The induction radiant broiler according to claim 1, wherein said non-metallic support plate is made of either ceramic, glass, stainless steel or plastic, whereby said non-metallic support plate remains cool to the touch during induction heating.

3. The induction radiant broiler according to claim 1, wherein said non-metallic support plate is substantially unbroken.

4. The induction radiant broiler according to claim 1, wherein each elongated bar includes a heat sink means in said base portion for dissipating heat and absorbing an induction field.

5. The induction radiant broiler according to claim 4, wherein said heat sink means causes heat to flow from said food heating surface toward said base portion.

6. The induction radiant broiler according to claim 1, wherein said food heating surface has a smaller cross-sectional width than said base portion.

7. The induction radiant broiler according to claim 1, wherein a cross-sectional area of said elongated metallic bar tapers from said base surface to said food heating surface.

8. The induction radiant broiler according to claim 1, wherein said elongated metallic bar has an approximately parabolic cross-sectional area.

9. The induction radiant broiler according to claim 1, wherein said base portion is heated up to an infra-red band range.

10. The induction radiant broiler according to claim 1, wherein said grate comprises a ferrous material.

11. The induction radiant broiler according to claim 1, wherein said grate comprises cast iron.

12. The induction radiant broiler according to claim 1, wherein said plurality of elongated metallic bars are positioned substantially parallel to each other.

13. The induction radiant broiler according to claim 1, wherein said plurality of elongated metallic bars are connected to each other via metallic cross-connect bars.

14. The induction radiant broiler according to claim 1, wherein said induction heating means includes at least one induction heating coil mounted below and adjacent to said non-metallic support plate.

15. The induction radiant broiler according to claim 14, wherein said induction heating coil is aligned with a corresponding elongated bar.

16. The induction radiant broiler according to claim 14, wherein said induction heating coil is approximately snake-shaped.

17. The induction radiant broiler according to claim 14, wherein said induction heating coil is approximately oval-shaped.

18. The induction radiant broiler according to claim 14, wherein said induction heating coil is approximately rectangular-shaped.

19. The induction radiant broiler according to claim 14, wherein said induction heating means includes a power supply coupled to said heating coil.

20. The induction radiant broiler according to claim 1, wherein said base portion of said elongated bar is substantially planar.

21. The induction radiant broiler according to claim 1, further comprising means for controlling a temperature of said elongated bar.

22. The induction radiant broiler according to claim 21, wherein said temperature of said elongated bar is controlled according to a material composition of said elongated bar.

23. The induction radiant broiler according to claim 21, wherein said means for controlling a temperature includes means for adjusting an amplitude and frequency of said current driving said induction heating coils.

* * * * *